(12) United States Patent
Carr (10) Patent No.: US 7,682,996 B2
(45) Date of Patent: Mar. 23, 2010

(54) VIBRATORY SCREEN

(75) Inventor: Brian S. Carr, Burlington, KY (US)

(73) Assignee: M-I L.L.C., Houston, TX (US)

( * ) Notice: Subject to any disclaimer, the term of this patent is extended or adjusted under 35 U.S.C. 154(b) by 813 days.

(21) Appl. No.: 10/302,789

(22) Filed: Nov. 21, 2002

(65) Prior Publication Data

US 2004/0102117 A1    May 27, 2004

(51) Int. Cl.
*D03D 15/00* (2006.01)
*B07B 1/49* (2006.01)

(52) U.S. Cl. .................. 442/229; 209/401; 209/403

(58) Field of Classification Search .............. 442/197, 442/229, 238, 251, 263, 244, 283; 209/401; 245/2
See application file for complete search history.

(56) References Cited

U.S. PATENT DOCUMENTS

| 659,416 | A | 10/1900 | Perry | |
|---|---|---|---|---|
| 1,459,845 | A | 6/1923 | Mitchell | |
| 1,718,385 | A | 6/1929 | Sherwood | |
| 1,947,307 | A | 2/1934 | Rafton | 209/401 |
| 2,061,850 | A | 11/1936 | Roberts | 210/76 |
| 2,082,513 | A | 6/1937 | Roberts | 210/76 |
| 2,455,383 | A | 12/1948 | Pickard | |
| 2,604,989 | A | 7/1952 | Warhol | 209/401 |
| 2,723,032 | A | 11/1955 | Gisler et al. | 209/401 |
| 3,214,314 | A | 10/1965 | Rowbottam | 156/160 |
| 3,261,469 | A | 7/1966 | Wehner | 209/325 |
| 3,905,788 | A | 9/1975 | Alliger | 55/489 |
| 4,028,230 | A | 6/1977 | Rosenblum | 209/403 |
| 4,120,785 | A | 10/1978 | Kanamori et al. | 209/401 |
| 4,247,007 | A | 1/1981 | Kai | 209/392 |
| 4,479,999 | A * | 10/1984 | Buckley et al. | 442/199 |
| 4,526,682 | A | 7/1985 | Wallace | 209/337 |

(Continued)

FOREIGN PATENT DOCUMENTS

DE    31 14573    4/1987

(Continued)

*Primary Examiner*—D. Lawrence Tarazano
*Assistant Examiner*—Altrev C Sykes
(74) *Attorney, Agent, or Firm*—Connolly Bove Lodge & Hutz LLP (57) ABSTRACT

A screen includes three or four layers of woven metal screen cloth. The coarsest of these layers is a structural layer includes threads which are woven into the cloth with surfaces which are fusible below a temperature at which the other layers of screen cloth are heat affected. These woven threads include each of the threads in the coarse screen cloth with the coated threads being wire with fusible polypropylene or polyethylene coatings. The cloth could alternatively be coated or a fusible grid used between screens instead. A support layer above the structural layer may include a woven metal screen with woven elements which are either coated with fusible material or are solidly of fusible material woven periodically therethrough in at least one direction. A fusible grid could alternatively be employed. Screens are laminated with one or two fine mesh screens heated on the support woven screen cloth with fusible surfaces to locate the fusible material in the finer cloths. The structural layer of woven screen cloth has the fusible surfaces only encapsulating the support layer just above and not the finer screen cloths on the other side of the support layer.

17 Claims, 6 Drawing Sheets

U.S. PATENT DOCUMENTS

| | | | | |
|---|---|---|---|---|
| 4,575,421 A | 3/1986 | Derrick et al. | ............... | 209/397 |
| 4,696,751 A | 9/1987 | Eifling | ........................ | 210/780 |
| 4,728,422 A | 3/1988 | Bailey | ........................ | 210/314 |
| 4,762,610 A | 8/1988 | Freissle | ...................... | 209/397 |
| 4,861,462 A | 8/1989 | Lehmann et al. | ............ | 209/269 |
| 5,039,412 A | 8/1991 | Marsh | ........................ | 210/401 |
| 5,047,148 A | 9/1991 | Arai | ........................... | 210/498 |
| 5,076,924 A | 12/1991 | Persson et al. | .............. | 210/474 |
| 5,221,008 A | 6/1993 | Derrick, Jr. et al. | ......... | 209/269 |
| 5,330,057 A | 7/1994 | Schiller et al. | .............. | 209/392 |
| 5,385,669 A | 1/1995 | Leone, Sr. | .................... | 210/488 |
| 5,417,793 A * | 5/1995 | Bakula | ..................... | 156/308.2 |
| 5,417,858 A | 5/1995 | Derrick et al. | ............... | 210/388 |
| 5,417,859 A | 5/1995 | Bakula | ........................ | 210/388 |
| 5,587,077 A | 12/1996 | Aaltonen et al. | ............ | 210/498 |
| 5,598,930 A | 2/1997 | Leone et al. | ................. | 209/403 |
| 5,673,797 A | 10/1997 | Bakula et al. | ............... | 209/392 |
| 5,720,881 A | 2/1998 | Derrick et al. | ............... | 210/388 |
| 5,783,077 A | 7/1998 | Bakula | ........................ | 210/388 |
| 5,814,218 A | 9/1998 | Cagle | ......................... | 210/388 |
| 5,851,393 A | 12/1998 | Carr et al. | .................... | 210/489 |
| 5,868,929 A | 2/1999 | Derrick et al. | ............... | 210/388 |
| 5,876,552 A | 3/1999 | Bakula | ..................... | 156/308.2 |
| 5,888,336 A | 3/1999 | Bakula et al. | ............. | 156/308.2 |
| 5,944,993 A | 8/1999 | Derrick et al. | ............... | 210/388 |
| 5,958,236 A | 9/1999 | Bakula | ........................ | 210/388 |
| 5,971,159 A | 10/1999 | Leone et al. | ................. | 209/399 |
| 6,000,556 A | 12/1999 | Bakula | ........................ | 210/388 |
| 6,032,806 A | 3/2000 | Leone et al. | ................. | 209/402 |
| 6,053,332 A | 4/2000 | Bakula | ........................ | 210/388 |
| 6,152,307 A | 11/2000 | Adams et al. | ................ | 209/403 |
| 6,202,856 B1 | 3/2001 | Carr | ............................ | 209/401 |
| 6,220,449 B1 * | 4/2001 | Schulte et al. | ............... | 209/401 |
| 6,237,780 B1 * | 5/2001 | Schulte | ....................... | 209/401 |
| 6,431,368 B1 | 8/2002 | Carr | ............................ | 209/403 |
| 6,450,345 B1 * | 9/2002 | Adams et al. | ................ | 209/399 |
| 6,510,947 B1 * | 1/2003 | Schulte et al. | ............... | 209/401 |

FOREIGN PATENT DOCUMENTS

| | | |
|---|---|---|
| WO | WO 94/15723 | 7/1994 |
| WO | WO 94/23849 | 10/1994 |
| WO | WO99/24144 | 5/1999 |

* cited by examiner

VIBRATORY SCREEN

BACKGROUND OF THE INVENTION

The field of the present invention is screens employed for separation of product using vibrational energy.

Vibratory screen systems have long been employed in both circular and rectangular form. The devices typically include a resiliently mounted housing having a screen extended across the housing. A vibration generating drive is coupled with the housing to vibrate the screen in an advantageous manner to increase screening efficiency. The screens are either self contained by including screen cloth tensioned and bonded to a frame or rely on mechanisms on the resiliently mounted housing for placement and tensioning: In the latter circumstance, the screen typically includes screen cloth to which may be mounted hooks or eyes for attachment of tensioning mechanisms associated with the housing.

Alternatively, screens can include a perforated plate with screen cloth bonded thereto. When a plate is used, the screen may be tensioned before bonding to the plate. The screen cloth may be bonded to the plate by a layer of epoxy or thermoplastic material. The bonding material is positioned on the plate and the screen tensioned thereover. The material is then treated, commonly by heating to either initiate curing of the epoxy or fusing of the thermoplastic material. Nonstick layers of PTFE sheet may be employed where the assembly is compressed during the curing or fusing step. Multiple layers of screen cloth are known to be used in such assemblies. The plates include interstices for the passage of the screened material therethrough.

Screens which employ hooks or eyes for tensioning by a separate mechanism having laminated layers have also been known. Bonding to frames by spot welding, epoxy or fusible material are known. Further, fusing multiple layers of screen cloth into the top of a frame structure made of fusible material having a peripheral frame and a pattern of open cells defined by cell walls has been previously known. The multiple screen cloths are bonded to the frame and the cell walls by fusing the frame structure and resolidifying it after impregnation through the screen cloth or cloths. Such a structure is disclosed in U.S. Pat. No. 5,851,393, the disclosure of which is incorporated herein by reference. Backup layers have been coated with epoxy and bonded to filter cloth such as disclosed in U.S. Pat. No. 5,814,218. Diffusion bonding is practiced between metal screens. The layers of screen cloth are pressed together and subjected to substantial heat for an extended time. No bonding material is used in the diffusion bonding process.

A laminated screen having two or more woven screen cloths is also known which has threads in one of the cloths having surface portions which are fusible below a temperature at which the other woven screen cloth is heat affected. Heat effects to be avoided are changes in the physical and chemical properties of the screen cloth. These threads with surface portions fusible below a temperature at which the other woven screen cloth is heat affected are woven into the cloth. The screen cloths are of different mesh size with the courser mesh including the threads with fusible surface material. The fusible surface material is fused into the other screen cloth at the knuckle contacts of these threads with the finer screen cloth. Threads with fusible surface portions may be dispersed within the screen cloth to best advantage. Such threads may be arranged in only one direction of the screen cloth. Such threads may be spaced apart with conventional threads therebetween. The threads with fusible surface portions may additionally be fusible fully therethrough. The screen cloth threads may be metal wire such as stainless steel. This system is disclosed in U.S. Pat. No. 6,431,368, the disclosure of which is incorporated herein by reference.

The foregoing vibratory screen has been found to provide substantial advantage in many industrial uses. In such uses, the lower supporting layer commonly employs a 20 mesh wire cloth. This mesh size provides sufficient support for the finer screens mounted above and affixed to the 20 mesh screen as described in U.S. Pat. No. 6,431,368. The assembly provides a degree of flexibility which enhances screening efficiency. However, such screening structures lack sufficient tensioning capability and underlying structural support to fully satisfy some applications such as cleaning recirculating drilling mud. However, to conventionally bond a plate or more rigid screen able to withstand such tensioning reduces the screening efficiency of the finer mesh.

SUMMARY OF THE INVENTION

The present invention is directed to a laminated screen including three or more metal woven screen cloths in juxtaposition. One of the outer screen cloths has a much coarser mesh than the remaining screen cloths. The laminate of all but the coarsest screen cloth has at least some of the treads in one screen cloth including fusible material. This fusible material is fused to encapsulate lengths of thread of at least all but the coarsest screen cloth to bind these screen cloths together. The coarsest screen cloth has a surface coating which is also fusible. This fusible surface material is fused into the most adjacent woven screen cloth only.

The controlled encapsulation of short lengths of wire of the second screen cloth by the third, structural screen cloth without additional encapsulation of the first screen cloth offers substantial throughput area by minimizing the blanked area on the laminated screen while offering substantial tensile strength for screen tensioning. At the same time, the first screen cloth is allowed to ungulate in response to vibration of the screening structure in keeping with the bonding only between the first and second screen cloths. As such, the need to compromise tensile strength and support to achieve high screen efficiency is obviated.

Accordingly, it is an object of the present invention to provide an improved vibratory screen structure. Other and further objects and advantages will appear hereinafter.

DETAILED DESCRIPTION OF THE PREFERRED EMBODIMENTS

Figure 1:
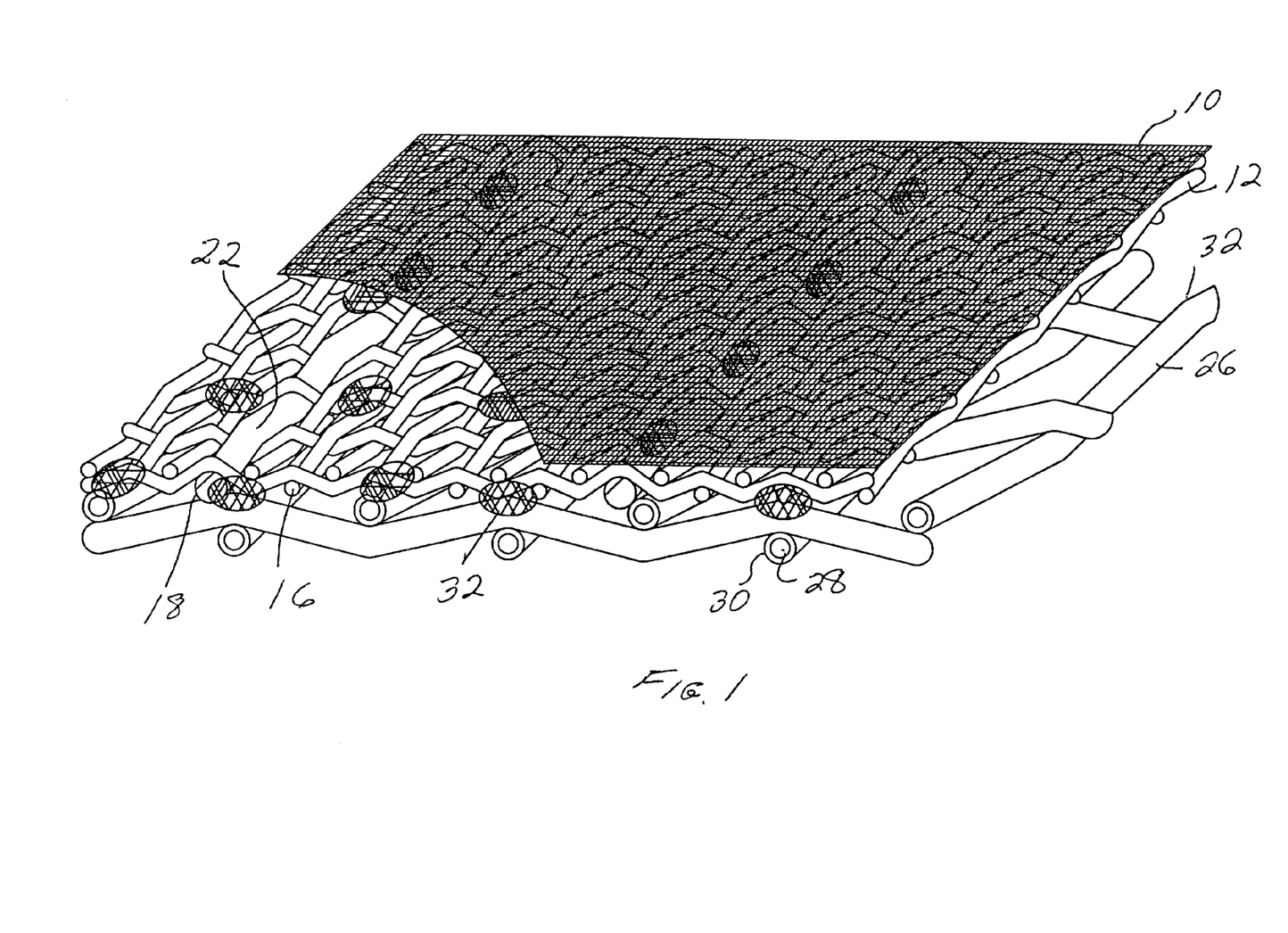
FIG. 1 is an assembled perspective view of a first laminated screen.
Figure 2:
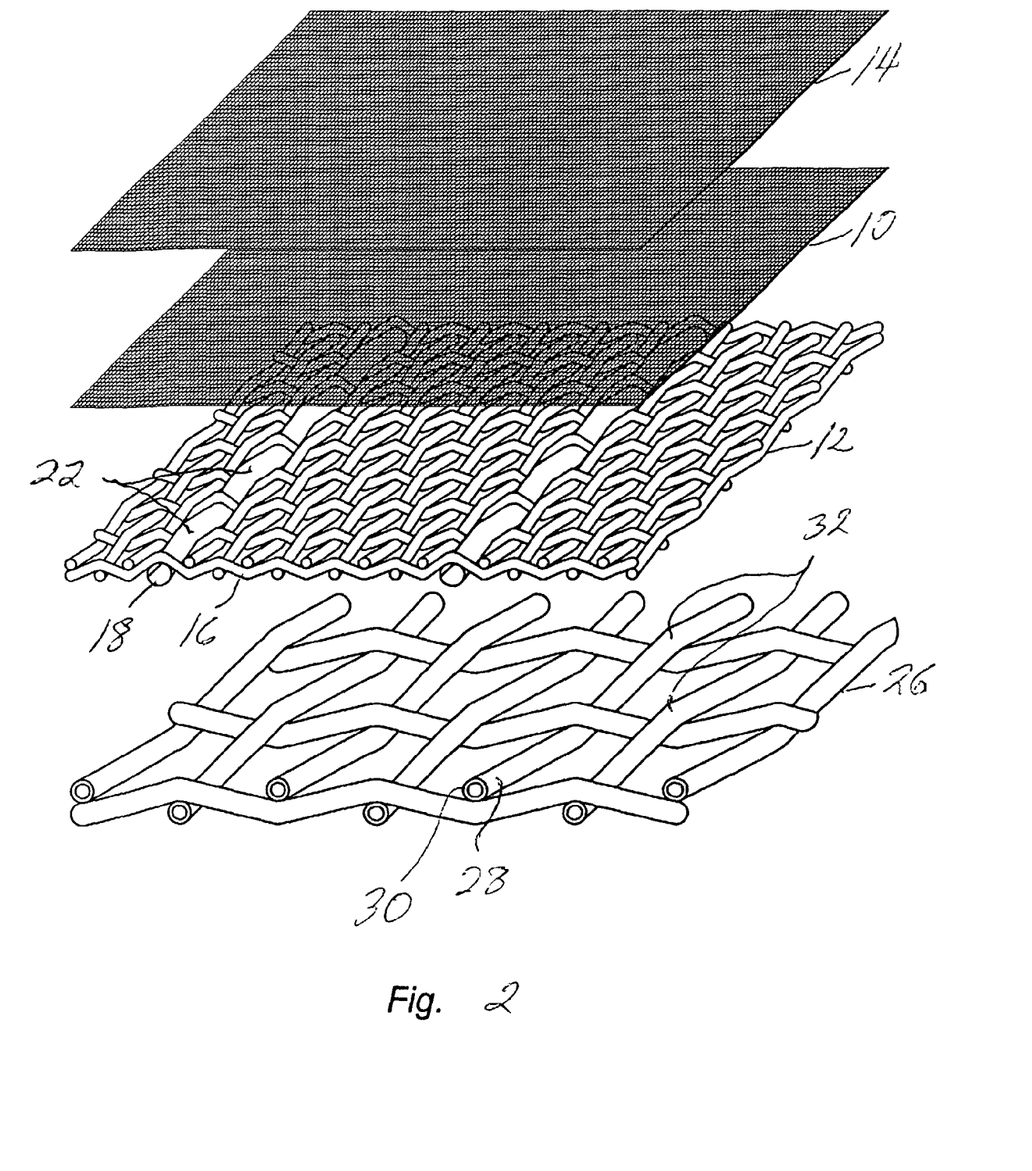
FIG. 2 is an exploded perspective view of the screen of FIG. 1.

Turning in detail to the drawings, FIGS. 1 and 2 illustrate a first screen. The screen is shown to include a first metal woven screen cloth 10. The mesh size and nature of the weave of this screen cloth as with the others described below may vary greatly to satisfy screening needs and customs in the target industry. The screen cloth 10 may have a range of mesh sizes from 38 mesh to 635 mesh. In extraordinary circumstances, the range could be extended.

A coarser woven metal screen cloth 12 is illustrated in juxtaposition with the first woven screen cloth 10. This second screen cloth 12 forms a support layer. The mesh size for the screen cloth 12 may be, with the same comments as above, as open as 11 mesh and as tight as 40 mesh.

A third woven metal screen cloth 14 of equal to or finer mesh than the first woven screen cloth 10 may be positioned on the other side of the first screen cloth 10 from the coarse screen cloth 12. For most applications, the coarse screen cloth 12 is substantially coarser than the first woven screen cloth 10 which is, in turn, typically coarser than the third woven screen cloth 14, when a third such layer is employed. In one example applicable to the oil field industry where fluid throughput suggests slotted screens, these screen layers have mesh sizes of 20×20 wires/inch (0.014" wire dia.), 120×60 wires/inch (0.0022" wire dia.) and 205×95 wires/inch (0.0018" wire dia.). All are of stainless steel.

The coarse woven screen cloth 12 is shown in the embodiment of FIGS. 1 and 2 to be made of stainless steel wires threads 16 with periodic threads 18 having fusible surface portions. In this embodiment, the threads 18 are additionally fully fusible there through. The threads 18 extend in only one direction and are spaced apart with uncoated threads 16 there between not fusible below the temperature at which the screen 10 is heat affected. The threads 18 are also woven into the fabric.

The fusible surface portions may be polypropylene or polyethylene. These materials are fusible below a temperature at which the screen cloth 10 and the screen cloth 14 are heat affected. For example, polypropylene is fused sufficiently to exhibit the required flow properties at between 400° F. and 450° F. As the wire of the screens is typically stainless, polypropylene and polyethylene are fusible well below a temperature at which the screen cloth is heat affected.

Because the coarse screen cloth 12 is woven, it provides knuckles which become the high points of contact between the coarse screen cloth 12 and the juxtaposed screen cloth 10. As the screen cloth 12 is preferably coarser than the screen cloth 10 to serve as a support layer, the knuckles of the coarse screen cloth 12 are spaced apart substantially, compared with the interstices through the screen cloth 10. Typically, the difference is even more pronounced between the support layer of the screen cloth 12 and the screen cloth 14 when employing even finer mesh.

The layers of screen cloth, a coarse mesh 12 with a fine mesh 10 or two fine meshes 10 and 14, are compressed together and heated. The compression may be accomplished by two platens. Depending on the system, either the platen on the side of the fine mesh screen or both platens may be heated to a sufficient degree that the fusible surface portions on the knuckles contacting the finer mesh screen cloth will melt and flow into the interstices in the screen cloth 10 or screen cloths 10 and 14. The process is intended to encapsulate short lengths of the wire making up the screen cloths of the fine mesh 10 or two fine meshes 10 and 14. This fusible material is then allowed to cool and solidify to create a laminated structure with attachment points 22. Where appropriate, thin layers of PTFE may be employed in the process to avoid sticking with the platens.

A further screen cloth 26 provides a fairly rigid support in juxtaposition with the screen cloth 12. This screen cloth 26 has a mesh size which may be, for example, as open as 1 mesh and as tight as 8 mesh. With the wire cloth 12 at 20 mesh, the wire cloth 26 is preferably at 4 mesh. The screen cloth 26 at 4 mesh includes wires 28 having a 0.0350" dia. with fusible a surface coating 30 on all of the wires 28, raising the diameter to between 0.0410" and 0.0475". Advantageously the wires are coated prior to weaving. However, the wires 28 may be coated with a fusible surface coating 30 after being made into a woven cloth. The same fusible materials may be employed as with the second screen cloth.

The laminated screen of the screen cloths 10, 12, 14 are described above as being separately laminated. The screen cloth 26 can be laminated with this first laminate in a separate step. However, it is also contemplated that all of screen cloths 10, 12, 14, 26 may be laminated at the same time. The fusible material in the surface coating 30 is contemplated to bond with or even encapsulate short lengths of the wire 16 of the screen cloth 12 without encapsulating any of the screen cloths 10 and 14. This allows the screen cloths 10 and 14 to be constrained by the screen cloth 12 at measured intervals according to the locations of the threads 18. The screen cloth 12 is then held down to the screen cloth 26 at other spaced locations 32 where knuckles of the screen cloth 26 contact the screen cloth 12. This result is achieved by having the thickness of the surface coating 30 on the screen cloth 26 be no more than the thickness of the screen cloth 12 to which it is to be bonded. Further additional bonding is achieved where the surface coating 30 fuses with the fusible material in the screen cloth 12. The fusible material is preferably the same in both screen layers. In the foregoing example, with a support screen cloth 12 of 20×20 mesh, the structural layer of the woven screen cloth 26 would be 4×4 (0.0410"-0.0475" dia. with a 0.035" metal wire dia.).

The wire 28 of the screen cloth 26 is preferably galvanized steel. This increases bonding with the fusible layer. It remains that the fusible layer preferably encapsulates any wire to be held as a stronger constraint is provided by such encapsulation. The properties of the screen cloth 26 are such that it provides substantial tensioning capability, protecting the finer screens 10 and 14. This tensile strength is advantageous for both mounting pretensioned on frames or post tensioning on the vibratory separators.

Figure 3:
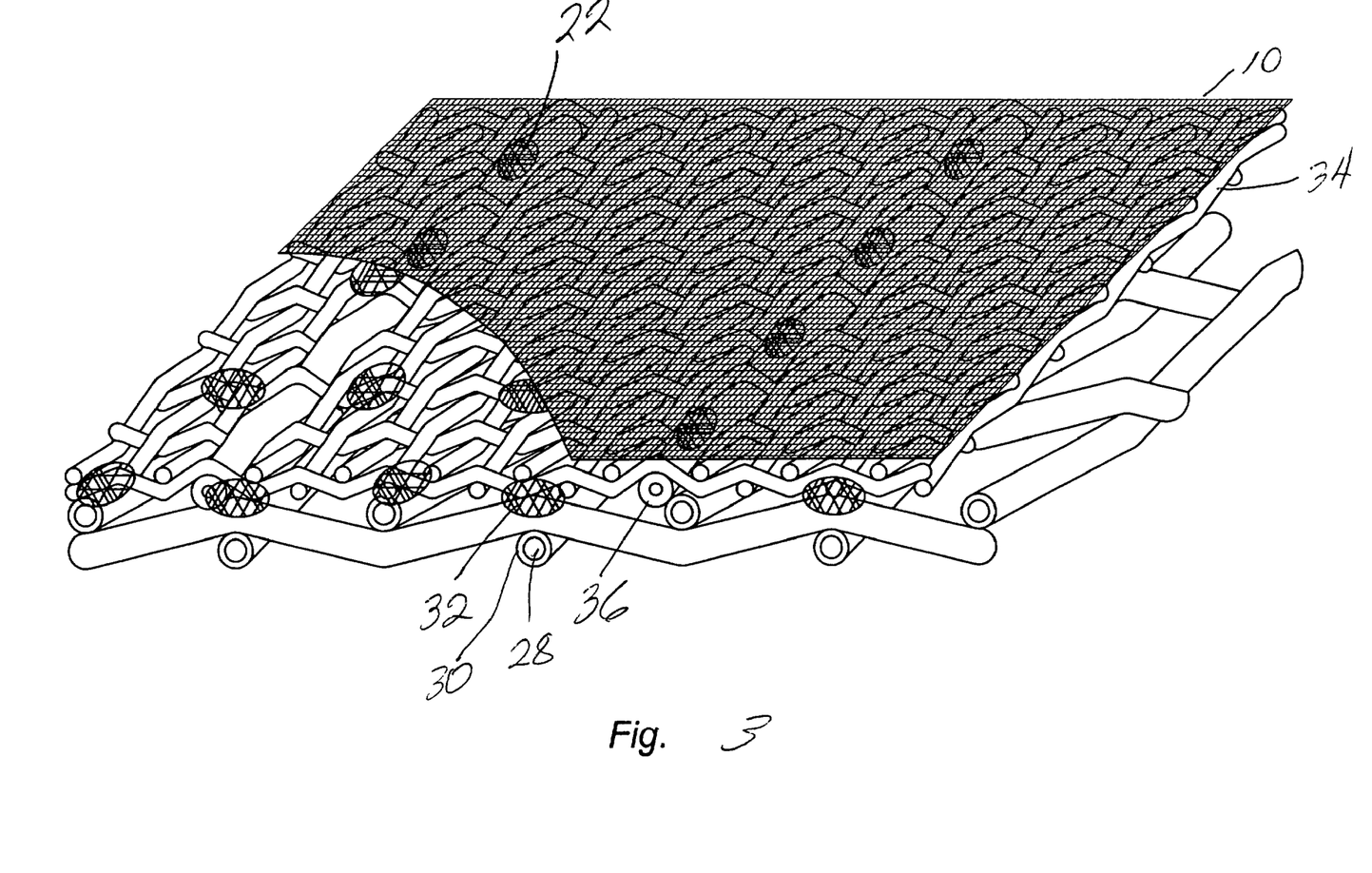
FIG. 3 is an assembled perspective view of a second laminated screen.
Figure 4:
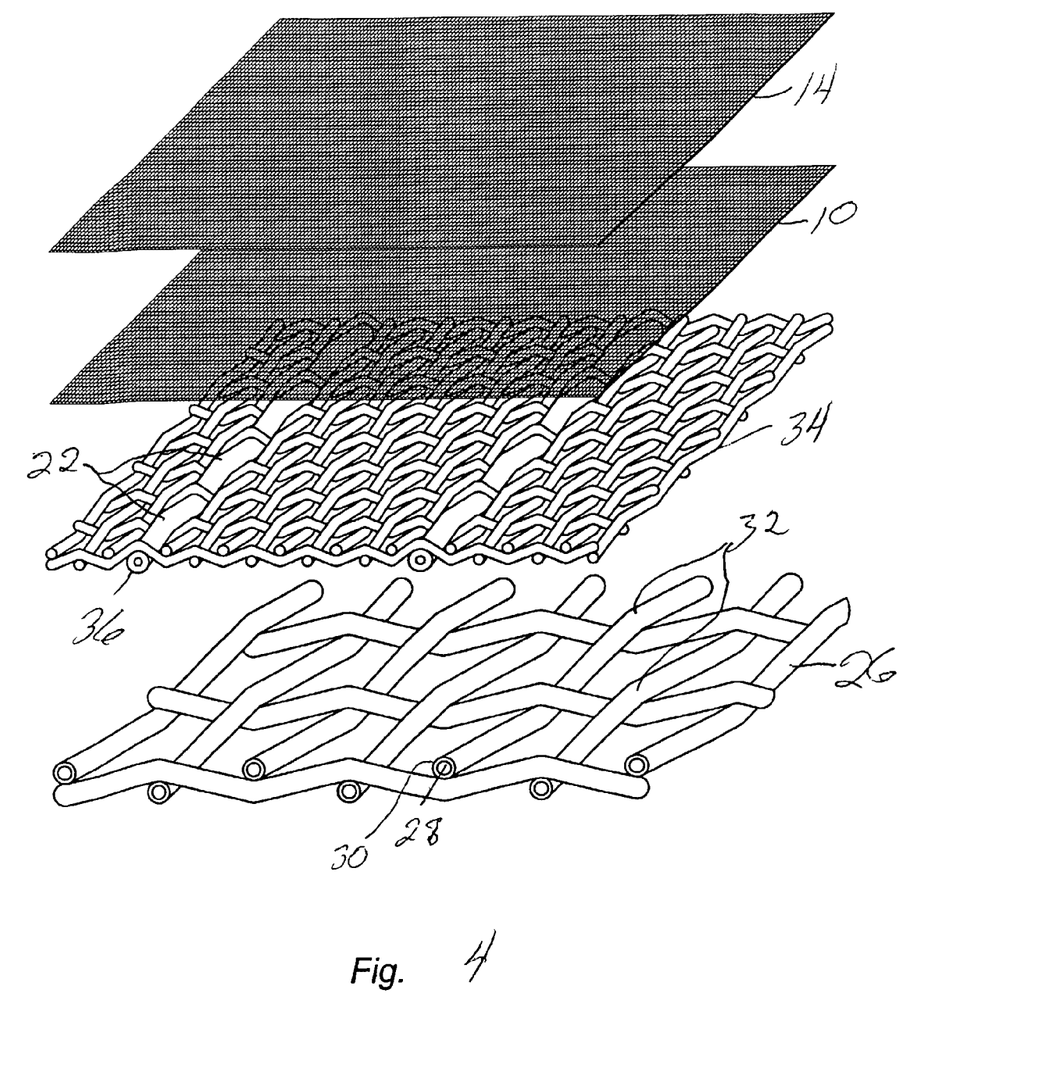
FIG. 4 is an exploded perspective view of the screen of FIG. 3.
Figure 5:
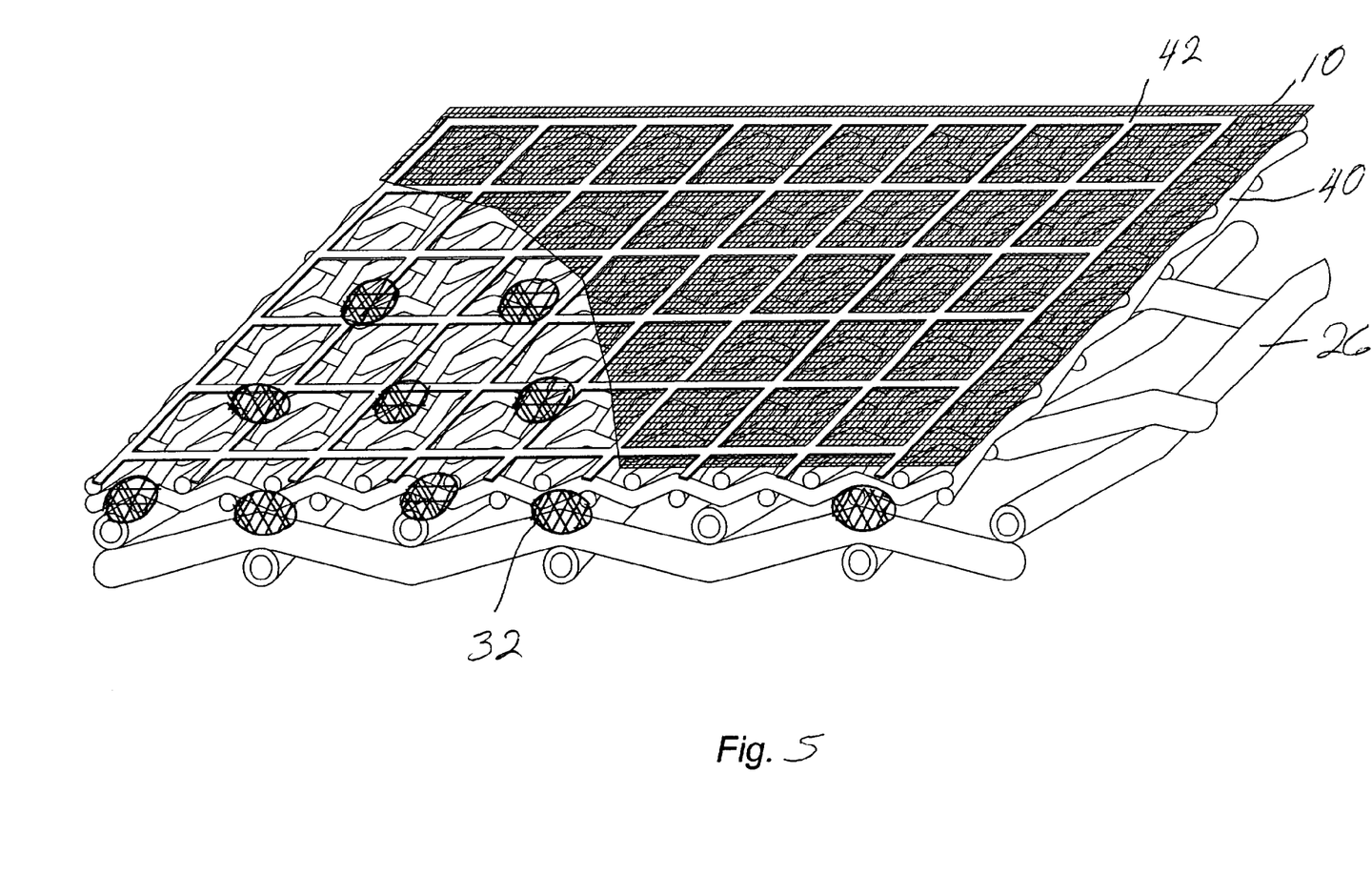
FIG. 5 is an assembled perspective view of a third laminated screen.
Figure 6:
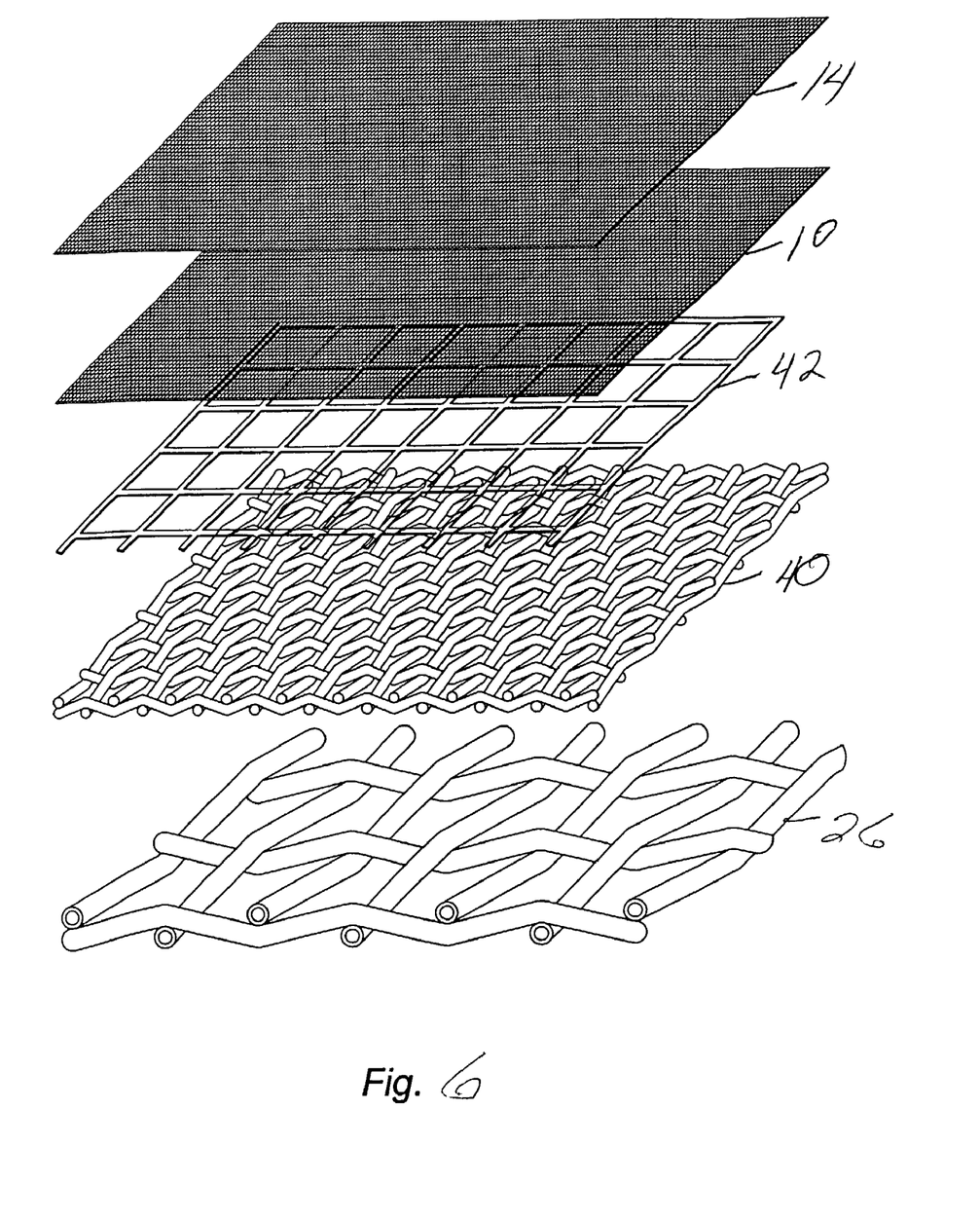
FIG. 6 is an exploded perspective view of the screen of FIG. 5.

The second embodiment illustrated in FIGS. 3 and 4 has the same structure as the embodiment of FIGS. 1 and 2 but for the screen cloth 34 replacing the screen cloth 12 of the first embodiment. The fusible material on the threads 36 is a surface coating on wire cores. The threads 36 are also woven into the fabric with the coating 38 thereon. An example of the coating in this instance on metal wire having a diameter of 0.018" will increase the thread diameter to 0.030". Again they are shown to be spaced apart and extend in only one direction. The threads there between are not fusible below the temperature at which the screen 34 is heat affected. An example in this instance for screen cloth having metal wire with a diameter of 0.018" would be to use The third embodiment of FIGS. 5 and 6 illustrate an arrangement where the fusible material is provided separately from the screen cloth 40 as a fusible grid 42 to bind the finer screen cloths 10 and 14 to the screen cloth 40. The fusible grid 42 is laminated and heated with the screens 10, 14, 40 to fuse the several screens together at the grid 42. This structure generally does not provide as much open area for screening as the woven fusible threads of the laminations of FIGS. 1 through 4. The structural screen cloth 26 is applied as discussed before.

Accordingly, new laminated screen structures are disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A screen comprising
   a first woven screen cloth having first metal threads;
   a second woven screen cloth in juxtaposition with the first woven screen cloth and having second metal threads;
   material fusible below a temperature at which the first woven screen cloth is heat affected fused to interlock the first woven screen cloth and the second woven screen cloth at first spaced locations encapsulating lengths of the first metal threads with a plurality of first metal threads between the encapsulated lengths of first metal threads not being encapsulated;
   a third woven screen cloth in planar juxtaposition with the second woven screen cloth and having third metal threads and knuckles on the third metal threads, the third metal threads having surfaces coating which are fusible below a temperature at which the first and second woven screen cloths are heat affected, the fusible surfaces coating being fused into the second woven screen cloth at least at some of the knuckles of the third woven screen cloth at second spaced locations other than the first spaced location, encapsulation short lengths of second metal threads and not being fused into the first woven screen cloth, the second woven screen cloth having finer mesh than the third woven screen cloth at second spaced locations other than the first spaced locations, encapsulating short lengths of second metal threads and not being fused into the first woven screen cloth, the second woven screen cloth having finer mesh than the third woven screen cloth.

2. The screen of claim 1, the fusible surfaces coating of the third metal threads being no thicker than the thickness of the second metal screen cloth.

3. The screen of claim 1 further comprising
   a fourth woven screen cloth in juxtaposition with the first woven screen cloth and having fourth metal threads, the fusible material being fused into the fourth woven screen cloth encapsulating short lengths of the fourth metal threads.

4. The screen of claim 1, the second woven screen cloth being 20 mesh and the third woven screen cloth being 4 mesh.

5. The screen of claim 1, the fusible material being a fusible grid positioned between the first and second woven screen cloths.

6. The screen of claim 1, the fusible material being on the surface of periodic threads of the second woven screen cloth.

7. The screen of claim 6, the periodic threads of the second woven screen cloth being fully fusible therethrough.

8. The screen of claim 1, the third woven screen cloth having all metal wires coated with fusible surfaces woven into the third woven screen cloth.

9. A screen comprising
   a first woven screen cloth having first metal threads;
   a second woven screen cloth in juxtaposition with the first woven screen cloth and having second metal threads, knuckles on the second metal threads and periodic threads having at least first fusible surfaces among the metal threads at least in one direction therein, the fusible surface portions being fusible below a temperature at which the first woven screen cloth is heat affected, the first woven screen cloth being of substantially finer mesh than the second woven screen cloth and in juxtaposition therewith, the fusible surfaces portion being fused into the first woven screen cloth at least at the knuckle contacts of the fusible surfaces portions with the first woven screen cloth at first spaced locations to encapsulate short lengths of the first metal threads;
   a third woven screen cloth in planar juxtaposition with the second woven screen cloth and having third metal threads with a surface coating woven into the third woven screen cloth with knuckles on the third metal threads, the surfaces coating being fusible below a temperature at which the first and second woven screen cloths are heat affected, the fusible surface coating fused into the second woven screen cloth at least at some of the knuckles of the third woven screen cloth at second spaced locations other than the first spaced locations, encapsulating short lengths of second metal threads and not being fused into the first woven screen cloth, the second woven screen cloth having a finer mesh than the third woven screen cloth.

10. The screen of claim 9, the fusible surfaces coating of the third metal threads being no thicker than the thickness of the second metal screen cloth.

11. The screen of claim 9 further comprising
    a fourth woven screen cloth in juxtaposition with the first woven screen cloth and having fourth metal threads, the first fusible surfaces portions being fused into the fourth woven screen cloth encapsulating short lengths of the fourth metal threads.

12. The screen of claim 9, the second woven screen cloth being 20 mesh and the third woven screen cloth being 4 mesh.

13. The screen of claim 9, the periodic threads of the second woven screen cloth having a wire core with the first fusible surfaces portions thereabout.

14. The screen of claim 9, the periodic threads of the second woven screen cloth being fully fusible therethrough.

15. The screen of claim 9, the third woven screen cloth having all metal wires coated with fusible surfaces coating.

16. A screen comprising
    a first woven screen cloth having first metal threads;
    a second woven screen cloth in juxtaposition with the first woven screen cloth and having second metal threads;
    material fusible below a temperature at which the first woven screen cloth is heat affected fused to interlock the first woven screen cloth and the second woven screen cloth encapsulating short lengths of the first metal threads at first spaced locations;
    a third woven screen cloth in planar juxtaposition with the second woven screen cloth and having third metal threads with a surface coating woven into the third woven screen cloth with knuckles on the third metal threads, the surface coating being fusible below a temperature at which the first and second woven screen cloths are heat affected, the fusible surface coating being at least partially fused into the second woven screen cloth encapsulating short lengths of second metal threads at second spaced locations other than the first spaced locations and not being fused into the first woven screen cloth, the second woven screen cloth having finer mesh than the third woven screen cloth.

17. The screen of claim 16, the fusible surface coating of the third metal threads being no thicker than the thickness of the second metal screen cloth.

* * * * *